Feb. 6, 1934.  G. L. COLBIE  1,945,967
STRIP WOUND TUBULAR ARTICLE
Filed April 23, 1932
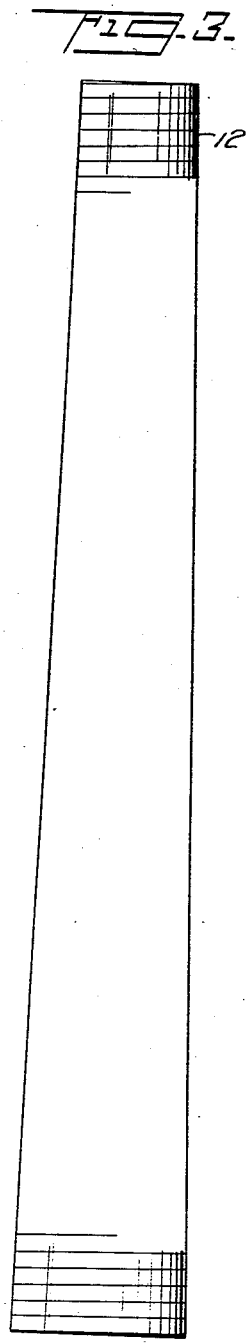
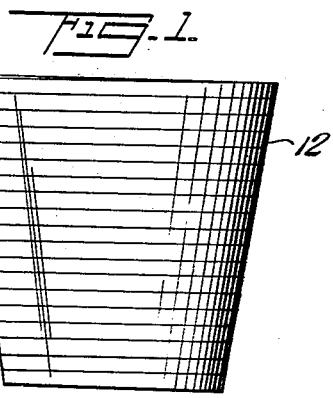
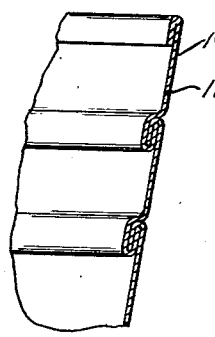
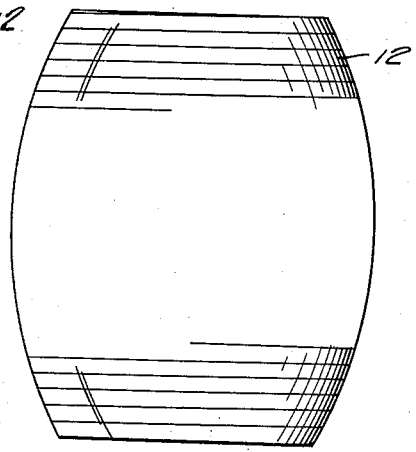
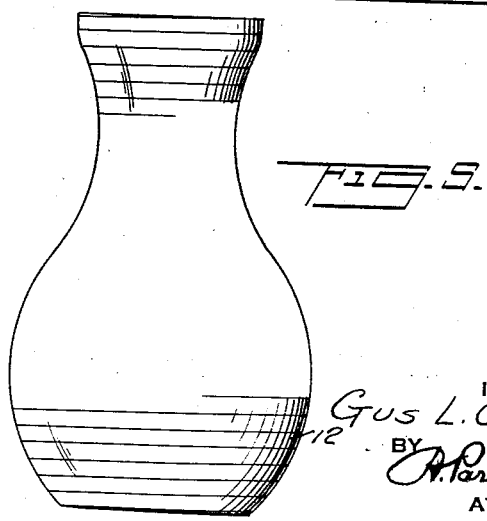
INVENTOR
Gus L. Colbie
BY
ATTORNEY Patented Feb. 6, 1934

1,945,967

UNITED STATES PATENT OFFICE 1,945,967

STRIP WOUND TUBULAR ARTICLES

Gus L. Colbie, Brooklyn, N. Y., assignor to F. MacGovern Corporation, New York, N. Y., a corporation of New York Application April 23, 1932. Serial No. 607,102

6 Claims. (Cl. 220—1)

My invention relates to tubular articles formed from strip material and more particular to articles having tapering forms or other surfaces of revolution of any desired longitudinal cross section varying from the perfectly cylindrical.

Tubular articles of perfectly cylindrical form have been made before from metallic strip material in the form of ash cans and similar articles but with the types of machines used in their manufacture, the articles were limited to the perfectly cylindrical form alone.

By the method described in my copending application, executed on the same day of execution of this application and bearing the filing date of April 23, 1932 and Serial No. 607,101, it is possible to make tubular articles from strip material of any desired longitudinal cross section, such as containers having tapered sides, tapered pile casings, bilge barrels and similar articles.

The said method of forming such tubular articles comprises generally, the preforming of the opposite edges of metallic strip material in such shapes, that, as they are overlapped in winding the strip on itself in a series of convolutions, they may be interlocked by pressure, but not clamped tightly one on the other. These loosely interlocked sections are then bent to arcs of varying radii and the loosely interlocked edges are then pressed tightly together, thus forming a spirally arranged series of adjacent convolutions, the procedure of bending and clamping being automatic and continuous.

According to prior practice, strip material of uniform diameter, was formed into convolutions in this general manner but the arc of curvature from the edge interlocking rolls to the edge clamping rolls was constant, so that the strip took on a helical form, and the article produced was a true, parallel sided cylinder. According to the method of procedure for forming articles of the type here illustrated and described, that arc of curvature is continuously varied according to a given pattern, and therefore the diameters of successive convolutions are increased or decreased; and this is done while they are being spun on the machine, under control of a pattern member. By changing the formation of the pattern, or its speed of rotation relative to that of the seam forming rolls, tubular articles of various shapes can be formed, and thus a new article of manufacture is produced.

In the following drawing and specification, I have illustrated and described several of the many varied forms of tubular articles which can be made by the machine and process described in my said copending application and perhaps by other apparatus.

In the drawing,

Fig. 1 is an elevation of a container having uniformly tapered sides, i. e., the frustum of a cone.

Fig. 2 is an enlarged sectional view through part of one wall of the container shown in Fig. 1.

Fig. 3 is an elevation of a slightly tapered form of my invention particularly adaptable for use as a pile casing.

Fig. 4 is an elevation of another form of container in the shape of a bilge barrel, and Fig. 5 is an elevation of a modified structure having a compound curved contour, and adapted for use as a vase or some such similar article.

Each of the above named structures is formed from strip material 10, preferably metallic material, which is spun into spiral convolutions 12, each convolution having its edges preformed to permit one convolution to be interengaged and interlocked with those on either side of it, as clearly indicated in Fig. 2 where the adjacent strip edges are shown hooked one into the other and clamped together in that position.

From the drawing, it will be observed that an unlimited variety of shapes can be made which will vary from a perfectly straight sided cylinder to a simple tapered form such as indicated in Figs. 1, 2 and 3, to the convex curved form of the type shown in Fig. 4 or a compound reversed curve, or taper, such as shown in Fig. 5. Any desired tubular shape may be made as easily as can the straight sided cylindrical articles. The various shapes so obtainable meet various requirements in the arts, and also present greater resistance to deformation than does a simple cylinder.

Having thus described my invention, I claim:

1. As a new article of manufacture, a tubular structure of varying diameters at different cross sections, composed of a strip of metal spirally wound upon itself with its adjacent edges interlocked.

2. A new article of manufacture such as defined in claim 1 which tapers uniformly from one of its ends to the other.

3. A new article of manufacture such as defined in claim 1 the walls of which have a convex axial cross section.

4. A new article of manufacture such as defined in claim 1 the walls of which present a reversed curve axial cross section.

5. As a new article of manufacture, a barrel, the bilge of which is formed entirely of a spirally wound strip of metal, the convolutions of which have their adjacent edges interlocked and clamped together.

6. As a new article of manufacture, a tubular structure formed of a single flat strip of metal coiled into convolutions of progressively varying diameter, the edges of each convolution of said strip being interlocked with and clamped to the edges of the adjacent convolutions thereof.

GUS L. COLBIE.